US012733634B2

(12) United States Patent
Kennedy et al.

(10) Patent No.: US 12,733,634 B2
(45) Date of Patent: Sep. 15, 2026

(54) CONDUIT PLUG FOR PROTECTING ELECTRICAL WIRES

(71) Applicant: CorrSolve Corrosion Solutions, LLC, Fort Worth, TX (US)

(72) Inventors: Joshua Kennedy, Fort Worth, TX (US); Brett Thompson, Aledo, TX (US); Chad Knight, Dodd City, TX (US); Matt Boyd, Fort Worth, TX (US); Jeff Busby, Millsap, TX (US); Michael Dry, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 0 days.

(21) Appl. No.: 18/937,904

(22) Filed: Nov. 5, 2024

(65) Prior Publication Data

US 2025/0143285 A1 May 8, 2025

Related U.S. Application Data

(60) Provisional application No. 63/596,812, filed on Nov. 7, 2023.

(51) Int. Cl.
*A01M 29/30* (2011.01)
*A01M 29/12* (2011.01)
*F16L 7/02* (2006.01)

(52) U.S. Cl.
CPC ............ *A01M 29/30* (2013.01); *A01M 29/12* (2013.01); *F16L 7/02* (2013.01)

(58) Field of Classification Search
CPC ............ F16L 37/60; F16L 7/02; A01M 29/30; A01M 29/12
See application file for complete search history.

(56) References Cited

U.S. PATENT DOCUMENTS 4,751,947 A * 6/1988 Landers .................. H02G 9/06 141/1
4,889,450 A * 12/1989 Anne .................... F16L 55/165 285/31
5,700,012 A * 12/1997 Froehlich ............ H02G 15/013 174/93
6,739,598 B1 * 5/2004 Saarem .................... F16L 7/02 385/136
10,003,141 B2 * 6/2018 Komori .............. H01R 13/5205
2003/0234498 A1 12/2003 Busby et al.
2005/0103393 A1 * 5/2005 Foxton ................. F16L 59/143 138/148

(Continued)

FOREIGN PATENT DOCUMENTS

WO WO-0204843 A2 * 1/2002 ............ H02G 15/04

*Primary Examiner* — Eugene G Byrd
(74) *Attorney, Agent, or Firm* — Jack V. Musgrove; Daniel D. Chapman

(57) ABSTRACT

A sealant assembly for sealing a conduit, the conduit carrying electrical wires, between inside and outside of an enclosure such as a railroad control box. The sealant assembly may include a plug dimensioned for an interference fit with the conduit and with a bore in a body thereof. The body of the plug may have a slot allowing one to open the bore for inserting electrical wires thereinto. A sealant such as a cure-in-place polymer mix or a cured tape may be used to fill the conduit around the electrical wires. Such a sealant assembly will help keep moisture and harmful critters such as mice, from getting into the enclosure.

22 Claims, 7 Drawing Sheets

(56) References Cited

U.S. PATENT DOCUMENTS

2012/0312560 A1* 12/2012 Bahr ................... E21B 33/1208 166/387
2013/0106060 A1* 5/2013 Beele ........................ F16L 7/02 277/626
2015/0056903 A1* 2/2015 Nagano .................... F23J 13/04 122/18.31
2015/0069059 A1* 3/2015 Archer ...................... E04B 1/72 220/200
2021/0253919 A1 8/2021 Tosh et al.
2021/0364105 A1* 11/2021 Smith ..................... F16L 25/14
2022/0015351 A1* 1/2022 Pannullo ............. F21V 37/0012

* cited by examiner

CONDUIT PLUG FOR PROTECTING ELECTRICAL WIRES

CROSS-REFERENCE TO RELATED APPLICATION

This application claims priority from U.S. Provisional Patent Application No. 63/596,812 filed Nov. 7, 2023, which is hereby incorporated.

BACKGROUND OF THE INVENTION

Field of the Invention

The present invention generally relates to conduit plugs for protecting electrical wires.

Description of the Related Art

Mice, insects and other critters are troublesome to electrical control boxes such as those used in conjunction with railroad crossings. Likewise, entry of moisture can be a problem, causing corrosion in some instances. The troublesome critters like to get into a control box and chew away at the wires, nest or otherwise destroy the sensitive parts inside the control box that are used to control the swing arms and other parts of the railroad crossing. A number of solutions have been proposed to deal with the critters, but they are persistent and new devices are needed to address this problem.

SUMMARY OF THE INVENTION

The present invention in at least one embodiment is generally directed to conduit plugs comprising a resilient, frustoconical body typically having a hardness in the range of Shore OO 20 to Shore D 70 (and in another range Shore A 20 to 100), the frustoconical body having in some embodiments, critter repellent chemicals therein, having a bore dimensioned to receive the electrical wires and also a slot connecting the bore to a sidewall of the body.

The body has a bore therethrough in some embodiments with a diameter equal to or greater than the diameter of the wire or wires and a slot cut through the body from a sidewall, top and bottom of the body to the bore. The slot is normally closed but may be manually opened as the body is resilient and somewhat flexible and when opened the wire or wires may be inserted through the slot to the bore. Alternatively, the slot may be omitted, and the wires simply run through the bore.

In addition, the plug may have a plug removal member, such as a zip tie integrated into the body with part of the removal member extending outside the body such that when the body is urged into the conduit, narrow end first, it may be removed by grasping the removal member and applying a removal pressure thereto.

In addition, the plug may receive an elastomer sealant, such as a tape or a polymer mix, surrounding the wires at least in part where the wires are run through the bore in such a manner that the elastomer sealant at least partly seals off a space between and around the electrical wires and the inner walls of the bore to help prevent moisture or critters from obtaining access through the bore or the conduit. This may be referred too sometimes as a plug and sealant assembly.

When the plug engages the conduit, it can wedge into the end and up against the inner walls of the conduit as the body of the plug is not rigid but has some give to it.

Thus, using the device, the plug alone or plug and sealant, may physically prevent critters and moisture from obtaining access through the conduit into an enclosure (such as a walled structure) and may also protect the wires as they are carried from an area outside an enclosure to within the enclosure.

Applicant also provides a method of using the plug or plug and sealant with a conduit and the electrical wires and provide a system or assembly for protecting the wires and protecting an enclosure such as an enclosure carrying electrical elements for use with a railroad crossing or switch, from moisture and critter ingress.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Figure 1:
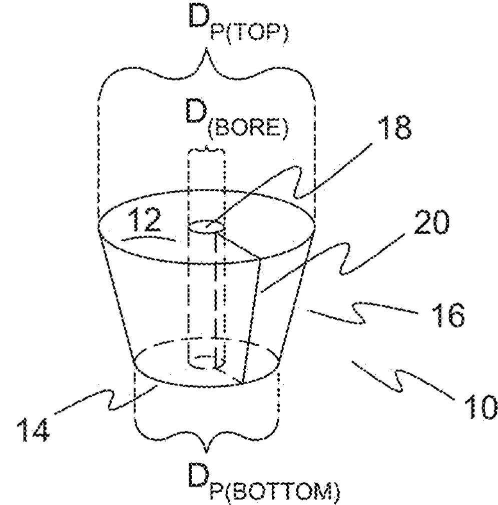
FIG. 1 is a perspective view of a plug with a slot in a closed position in accordance with one implementation of the present invention.
Figure 2:
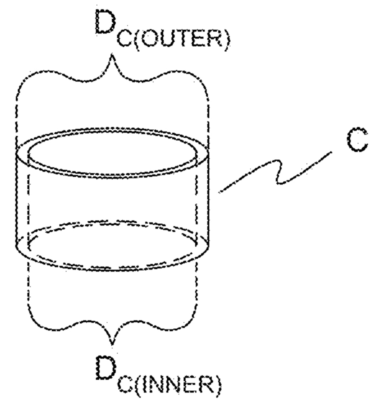
FIG. 2 is an illustration of a conduit C with an outer diameter $D_{C(OUTER)}$ and an inner diameter $D_{C(INNER)}$, the conduit for receiving various embodiments of the present inventions.

The various figures illustrate a plug having a frustoconical body 10 having a top 12, a bottom 14, and a sidewall 16. The body has at least one bore 18 that extends from the top 12 through to the bottom 14. The body also contains at least one slot 20 that runs from the sidewall to the top and bottom wall into the bore.

Figure 1A:
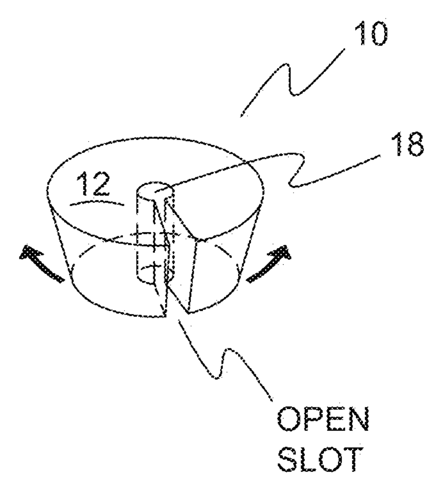
FIG. 1A is an illustration of the plug with the slot in an open position.

The body is typically comprised of a material with rebound resilience such as a rubber (natural or synthetic), polyurethane or polyurea or hybrid in some embodiments, having a hardness of Shore 00 20 to Shore D 70 (in other embodiments Shore A 20-100). The body 10 typically has some elasticity and, while the slot 20 is normally in a closed position, it may be manually opened as seen in FIG. 1A to insert a wire or wires WB into the bore.

The sealants and/or the plug body may include critter resistant or critter repellent chemicals, which may include biocides or fungicides, and such chemicals such as those found in U.S. Patent Application Publication no. 2021/0253919 incorporated herein by reference. These chemicals may be non-toxic to humans.

Figure 3:
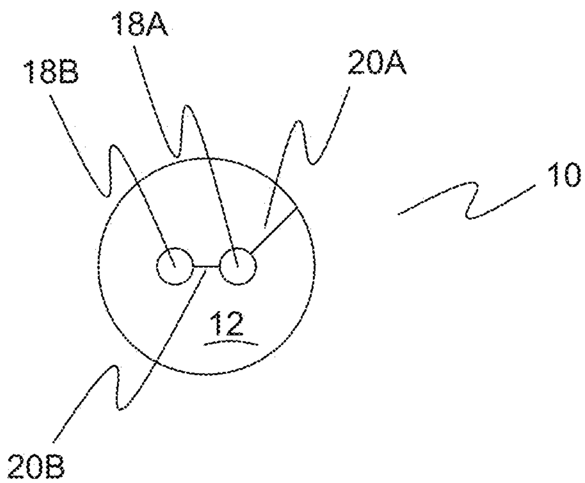
FIG. 3 is a top view of the plug showing two bores and two slots therein in accordance with one implementation of the present invention.

Some embodiments of the plug have more than one bore and more than one slot. FIG. 3 is a top view illustrating an embodiment having a first bore 18*a* and a second bore 18*b*, and a first slot 20*a* and a second slot 20*b*, the second slot connecting the first bore to the second bore, the slots allowing separate wires to be inserted into the two bores.

Figure 4A:
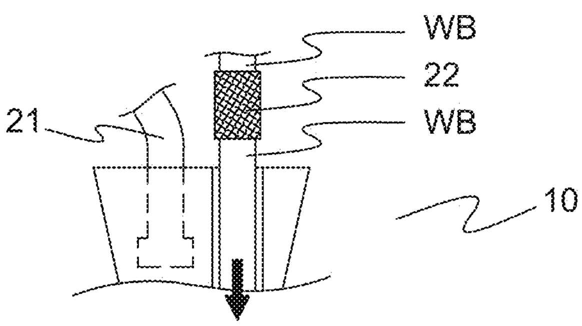
FIG. 4A is an illustration of the plug with wires running through the bore and an elastomer on the wire bundle in accordance with one implementation of the present invention.
Figure 4B:
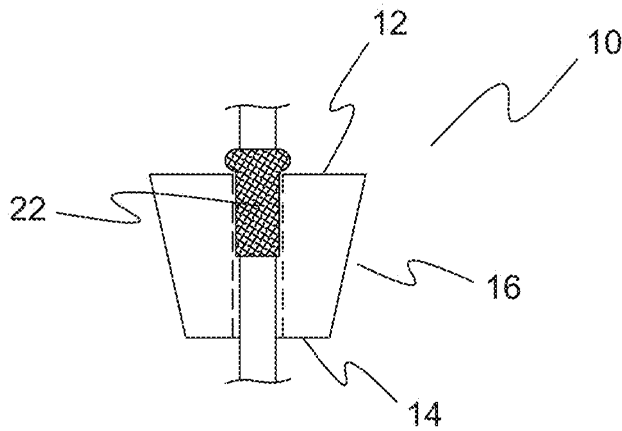
FIG. 4B shows the wire bundle and elastomer of FIG. 4A after they have been in place at least partly within the bore of the plug in accordance with one implementation of the present invention.
Figure 4C:
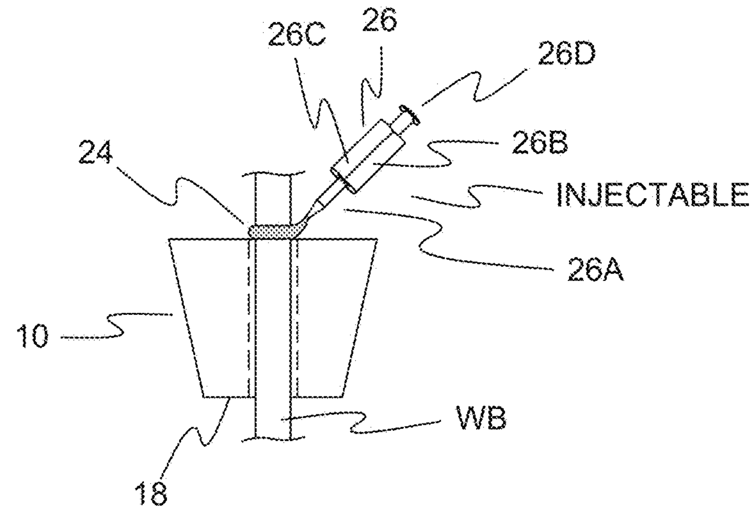
FIG. 4C illustrates the use of the plug with an injectable two-part cure-in-place polymer sealant in accordance with one implementation of the present invention.

FIGS. 4A, 4B and 4C illustrate the use of soft, polymer sealants 22/24 (tape/mix) with the body of the plug to help seal the wires in the bore. FIGS. 4A and 4B illustrate the use of a cured, soft tacky and in some embodiments stretchable polymer tape 22 which may be wrapped around the wire bundle as illustrated in FIG. 4A. The wire bundle WB then may be urged into the bore so that the soft deformable elastomer tape 22 forms a seal between the wires and the bore such as seen in FIG. 4B. FIG. 4C illustrates the use of an injector 26 having a mixing straw 26*a*, a first compartment 26*b*, a second compartment 26*c* and a forcing element 26*d*, the two compartments containing two parts of a polymer mix (resin and hardener) that may be mixed and applied as a mix 24, which may be applied at the junction of the wire bundle and the bore as seen in FIG. 4C to create a bead, which will then cure. Some uncured mix 24 may be forced into the bore, which will cure and help seal the bore to prevent critters and moisture from obtaining access therethrough. In some embodiments the two parts cure to a hardness range of Shore 00 10 to Shore D 70, in other embodiments the mix will cure harder or softer.

Figure 5:
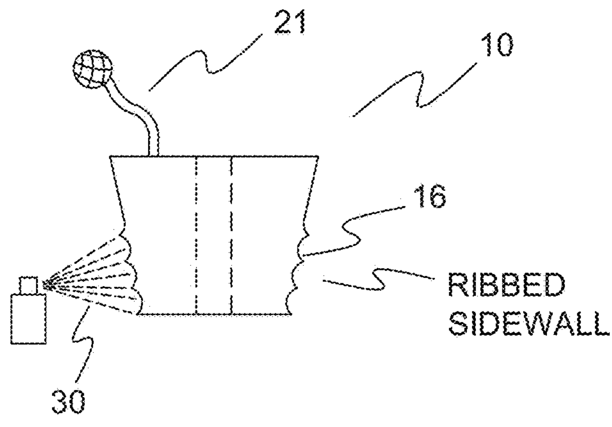
FIG. 5 illustrates a plug with a ribbed sidewall and also the manner of use of a spray lubricant to help insert the plug into the conduit in accordance with one implementation of the present invention.
Figure 6:
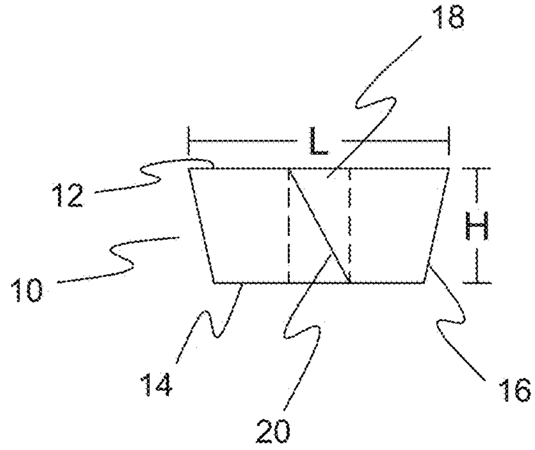
FIG. 6 illustrates a side view of the plug with a canted slot, the plug having a low aspect ratio in comparison with the plug of FIG. 4C, for example, in accordance with one implementation of the present invention.

FIG. 5 illustrates the use of a removal member 21 such as a flexible zip tie integral with the body which may be placed in the body before the body cures. The removal member allows the plug to be removed from the conduit after it has been forced, narrow end first into the conduit, the wires having been previously placed in the bore of the body via the open slot, see FIG. 1A. FIG. 5 also illustrates the use of a lubricant such as WD-40 or lithium grease on the sidewalls of the body to allow easier insertion of the plug into the conduit. Note that the slot 20 may be perpendicular to the top and bottom walls as illustrated in FIG. 1 or maybe canted as seen in FIG. 6. A canted slot may allow for a better seal and ease of insertion of the plug into the conduit.

While the sidewall of the body may be smooth as seen for example in FIGS. 1 and 4B it may also be ribbed or otherwise configured as seen in FIG. 5 which in some embodiments may provide a tighter seal or easier insertion into the conduit.

Figure 8:
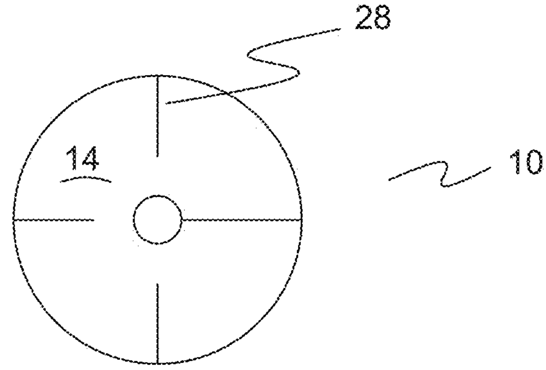
FIGS. 8, 9 and 10 are bottom, top, and side views of Applicant's plug with cuts therein in accordance with one implementation of the present invention.
Figure 9:
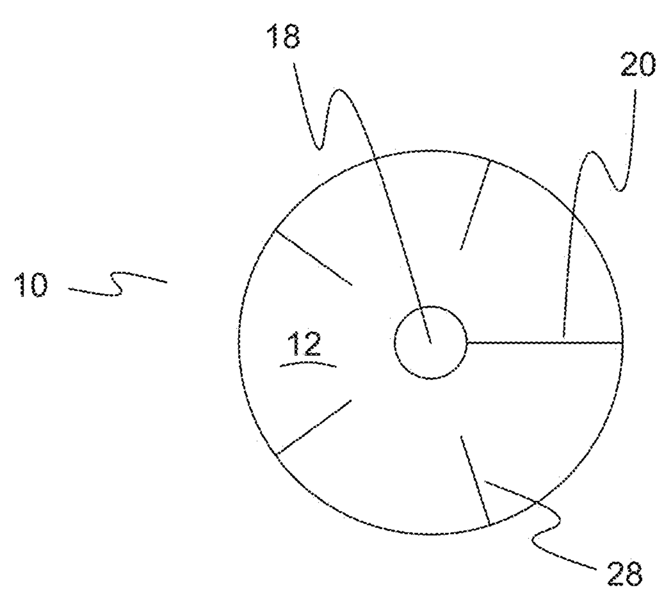
Figure 10:
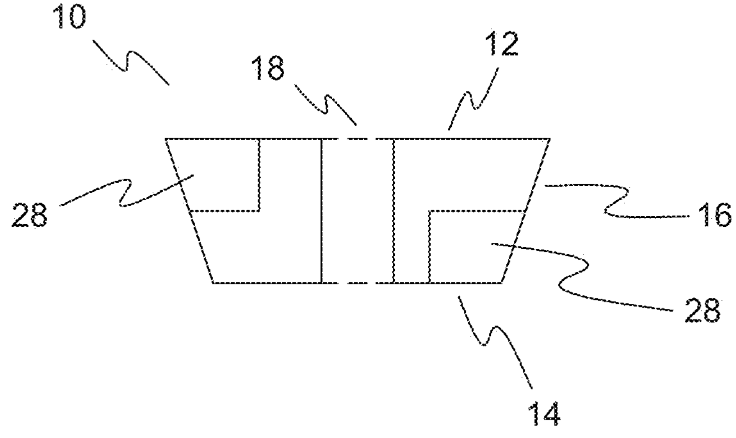

FIGS. 8, 9 and 10 all illustrate an arrangement of cuts 28 partially into but not through the body which cuts 28 may allow the plug to be inserted more easily into the conduit. As can be seen in these figures the cuts may be in the top wall FIG. 9, the bottom wall FIG. 8 and may extend partially through the body as seen in FIG. 10 or entirely through the body from top wall to bottom wall, but not into the bore (or else the body may break into two pieces).

FIG. 6 illustrates a low aspect ratio plug that has a length L across the top (i.e., diameter) greater than a height H. FIG. 4C on the other hand has a high aspect ratio wherein the length across the top wall is less than the height.

Figure 7:
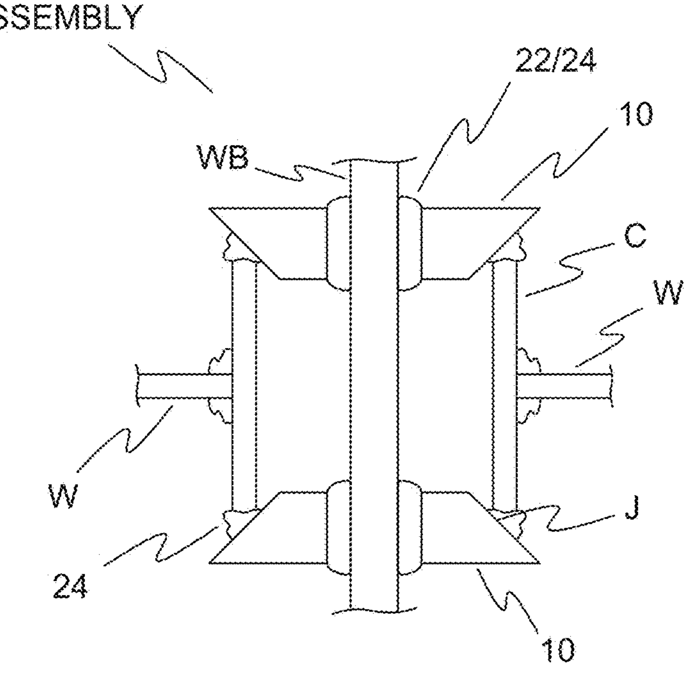
FIG. 7 illustrates a plug and sealant assembly or system used to protect wires running into a walled enclosure assembly comprising Applicant's novel plug or plugs, conduit, and walls in accordance with one implementation of the present invention.

FIG. 7 illustrates an assembly comprising Applicant's novel plug and, in some embodiments, a cure-in-place elastomer mix 24 which may act in some embodiments as a sealant and an adhesive (when it cures) circumferentially around the joint J between the side walls of the plug and the conduit. The cure-in-place elastomer mix 24 may also be used as a sealant where the plug goes through the walls W of a walled enclosure, see FIG. 7A. Note the space inside the conduit between the plug inner surfaces, this space may be partly or fully filled with sealant mix 24, before it sets up and cures. It will provide an even tougher path for critters or moisture to pass through.

Figure 7A:
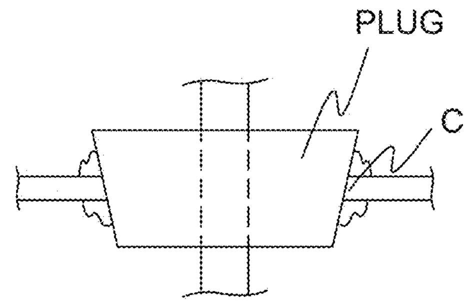
FIG. 7A illustrates an embodiment of Applicant's invention wherein the conduit is walls on an enclosure defining an opening in accordance with one implementation of the present invention.
Figure 7B:
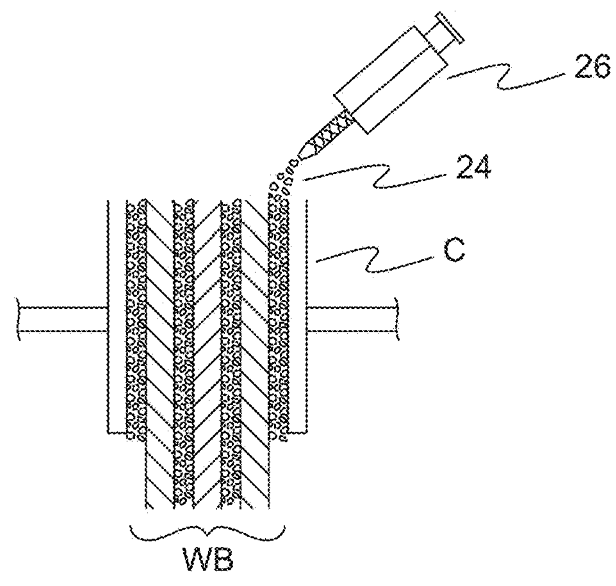
FIGS. 7B and 7C illustrate the manner in which Applicant's elastomer sealants may be used to at least partly seal a wire or wire bundle in the conduit to help prevent critters or moisture from passing into an enclosure.
Figure 7C:
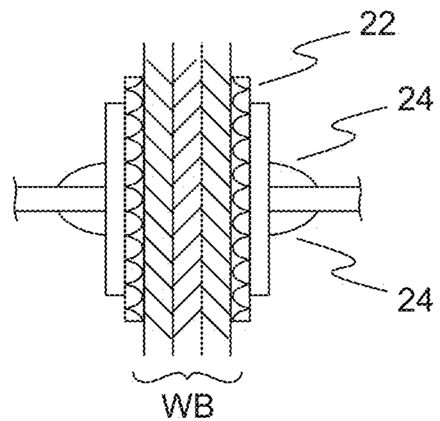

FIG. 7A illustrates the use of the plug on a conduit C that comprises merely a hole in the wall of an enclosure which contains electrical elements. In FIGS. 7B and 7C a conduit C comprises a separate tube that carries wires on the interior of the tube, with an outer opening and an inner opening. In FIG. 7B an injectable, two part cure-in-place polymer mix 24 is used to help seal the wires to the inner walls of the tube and encapsulate the wires. In FIG. 7C a sealant tape 22 is used comprising at least a cured elastomeric polymer such as polyurethane, and typically a tough skeleton, such as woven fiberglass or foam (see U.S. Patent Application Publication no. 2003/0234498, incorporated herein by reference), for wrapping the wires. The injectable may also be used inside the conduit, with the tape, for an effective seal. The injectable may also be used at the joints where the tube runs through the walls of the enclosure.

In some embodiments the enclosure is an electrical control box used outdoors and adjacent to railroad crossings, which control boxes include sensitive electrical equipment.

In some embodiments the diameter of the top $D_{P(TOP)}$ may be about the following: 1, 2, 3, 4, 5 or 6 inches. In some embodiments the diameter of the bottom $D_{P(BOTTOM)}$ may be about ½ to 1½ inches less than the diameter of the top. For example, if the diameter of the top were 4 inches the diameter of the bottom may be 2½ to 3½ inches. The inner diameter of the conduit will be greater than the bottom diameter of the plug but less than the top diameter of the plug.

A method is provided for protecting electrical wires and electrical elements inside an enclosure. It may include at least some of the following steps. Providing a plug and an electrical wire and opening the slot in the plug and inserting the electrical wires into the bore or bores of the plug. The plug may then be allowed to close and, optionally, spray lubricant may be applied to the side walls. The plug may then be urged into the top of a conduit or into the bottom of a conduit or both as in FIG. 7. Either a cured or cure-in-place elastomer can be provided any time before or after the plug is inserted. Insertion of the plug may be assisted with the use of a mallet or hammer. Removal of the plug may be assisted with the use of the removal member 21.

Figure 11:
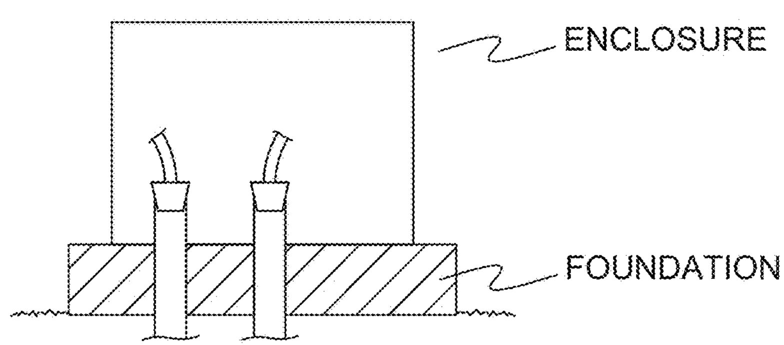
FIG. 11 is a front cross-sectional view of an enclosure, namely an electrical switchbox typically found adjacent a railroad track illustrating a use of Applicant's various embodiments of the present invention.

FIG. 11 is a front cross sectional view of an enclosure, namely an electrical switchbox typically found adjacent a railroad track in accordance with one implementation of the present invention (conduit such as PVC pipe or other pipe material, carrying electrical wires, that may include coaxial cable, typically comes through a foundation and terminates inside the enclosure). Applicant's conduit plug or plug and sealant assembly may be used to prevent critters from entering the conduit and crawling to the other end of the conduit, which may be a control box, where they may exit the conduit and destroy or nest inside that enclosure; indeed, Applicant's invention may be used to plug any conduit carrying wires anywhere, inside an enclosure or outside an enclosure—anywhere wires are adjacent a conduit opening.

Applicant provides a kit which provides a user with one or more plugs, which may be in a variety of sizes as well as sealant, either an injectable or a tape, or both. The foregoing may be packaged together for convenience to the user.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be affected to the particular embodiments by those of skill in the art. The scope of the claims should not be limited by the particular embodiments set forth in the examples but should be given the broadest interpretation consistent with the specification as a whole.

What is claimed is:

1. A device for engaging a conduit and further engaging one electrical wire or an electrical wire assembly, the conduit having a diameter, the device comprising:
- an at least partially frustoconical resilient body having a top, a bottom and a sidewall, at least one bore there-through and at least a slot through the top, bottom and sidewall connecting the bore and the sidewall, the slot manually openable but biased in a closed position;
- an elastomer sealant contacting at least some of the walls of the body;
- wherein the body has a hardness of Shore OO 10 to Shore D 70 and includes a critter resistant chemical;
- wherein the elastomer sealant includes the critter resistant chemical; and
- wherein the top of the body has a diameter greater than the diameter of the conduit, wherein the bottom of the body has a diameter less than the diameter of the conduit.

2. The device of claim 1 wherein the sidewall is smooth.

3. The device of claim 1 wherein the sidewall has circumferential ribs.

4. The device of claim 1 wherein the slot is perpendicular to the top wall.

5. The device of claim 1 wherein the slot is angled with respect to the top wall.

6. The device of claim 1 wherein the elastomer sealant is a tape or a mix.

7. The device of claim 1 further including a lubricant on at least some of the sidewall of the body.

8. The device of claim 1 wherein the slot is a first slot and the bore is a first bore and wherein the body includes a second bore and a second slot, the second slot connecting the first bore to the second bore.

9. The device of claim 1 where the hardness of the body is in the range of Shore A 30 to Shore A 100.

10. The device of claim 1 wherein the diameter of the top of the body is between 1" and 6".

11. The device of claim 1 wherein the body includes a removal member.

12. An assembly for protecting an electrical wire or wires enclosed in a conduit, the conduit having a diameter, the assembly comprising:
- a first plug comprising an at least partially frustoconical resilient body having a top, a bottom and a sidewall and at least one bore there through and a slot through the top, bottom and sidewall connecting the bore and the sidewall, the slot manually openable but biased in a closed position;
- wherein a composition of the body comprises a hardness of Shore OO 10 to Shore D 70 and includes a critter resistant chemical;
- wherein the top of the plug has a diameter greater than the diameter of the conduit, wherein the bottom of the plug has a diameter less than the diameter of the conduit;
- an elastomer sealant having the critter resistant chemical;
- wherein the electrical wire or wires fit within the bore of the plug; and
- wherein the elastomer sealant is disposed between the wires in the bore and the inner walls of the bore.

13. The assembly of claim 12 wherein the body includes a critter resistant chemical.

14. The assembly of claim 12 wherein the slot is a first slot and the bore is a first bore and wherein the body includes a second bore and a second slot, the second slot connecting the first bore to the second bore.

15. The assembly of claim 12 further including a second plug, the second plug adapted to engage the conduit and the wire or wires.

16. The assembly of claim 15 further including a cured elastomer mix in the conduit between the first and second plugs.

17. A method for protecting an electrical wire or wires running through a conduit of an enclosure, the method comprising the steps of:
- providing an elastomer;
- providing a plug, the plug comprising an at least partially frustoconical, elastomeric body having a top, a bottom and a sidewall and at least one bore there through and a slot through the top, bottom and sidewall connecting the bore and the sidewall, the slot manually openable but biased in a closed position, wherein the plug body has a hardness of Shore OO 10 to Shore D 70, wherein a composition of the body comprises critter resistant chemicals, wherein the top of the plug has a diameter greater than the diameter of the conduit, and wherein the bottom of the plug has a diameter less than the diameter of the conduit;
- opening the slot in the plug;
- inserting the electrical wire or wires into the bore;
- forcing the plug, bottom first, into the conduit; and
- placing the elastomer into the bore such that it contacts the inner walls of the bore and the wire or wires.

18. The method of claim 17 further including the step of coating at least part of the plug with a lubricant.

19. The method of claim 17 wherein the elastomer of the placing step is a cured polymer tape.

20. The method of claim 17 wherein the elastomer of the placing step is an injectable, two-part, cure-in-place polymer.

21. The method of claim 17 wherein the plug of the providing step has more than one bore.

22. The method of claim 17 wherein the forcing step includes the step of hammering the top of the plug.

* * * * *